Figure 1:
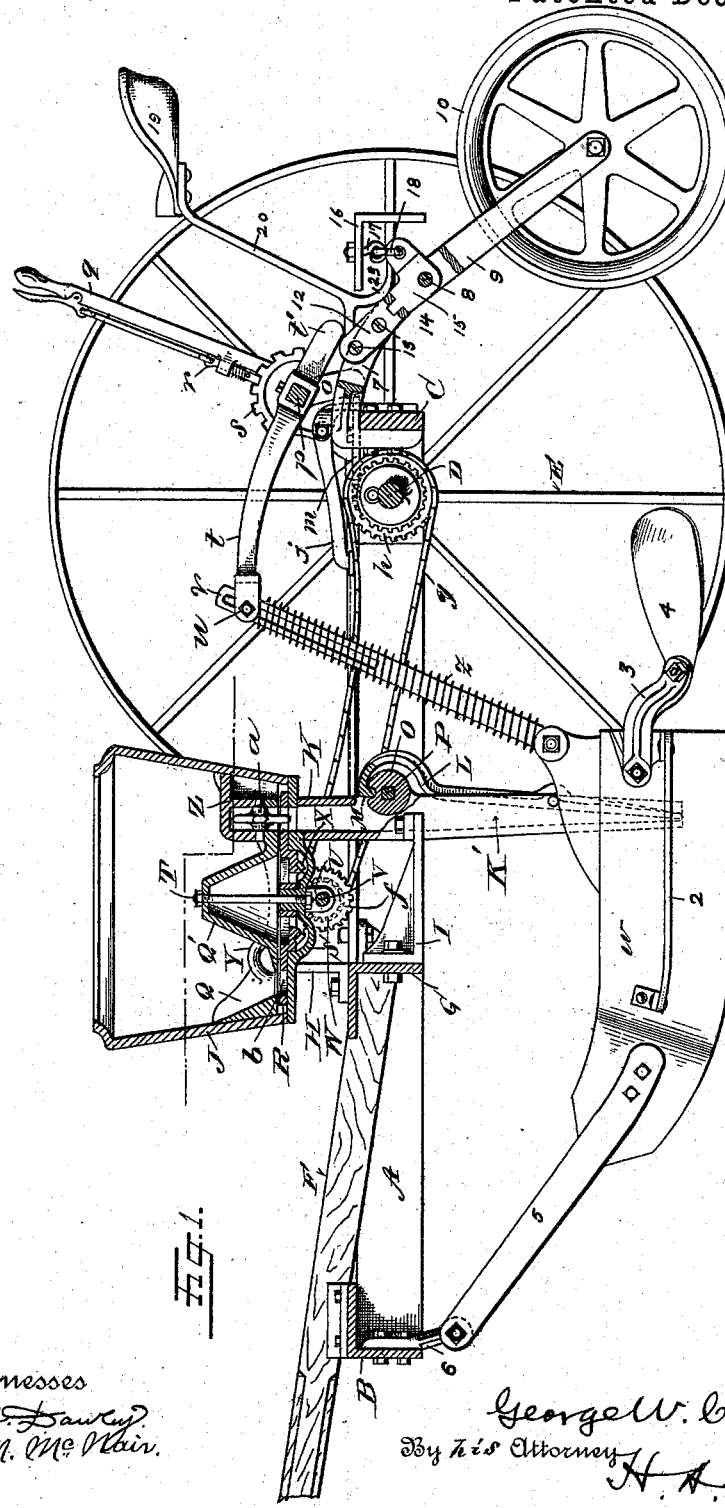

(No Model.) 4 Sheets—Sheet 1.
G. W. CAMPBELL.
CORN PLANTER.

No. 530,326. Patented Dec. 4, 1894.

Witnesses
Jas. C. Dawley
W. M. McNair

Inventor
George W. Campbell,
By his Attorney
H. A. Toulmin (No Model.) 4 Sheets—Sheet 2.

G. W. CAMPBELL.
CORN PLANTER.

No. 530,326. Patented Dec. 4, 1894.

Witnesses  
Inventor  
George W. Campbell,  
By his Attorney (No Model.) 4 Sheets—Sheet 3.
G. W. CAMPBELL.
CORN PLANTER.
No. 530,326. Patented Dec. 4, 1894.
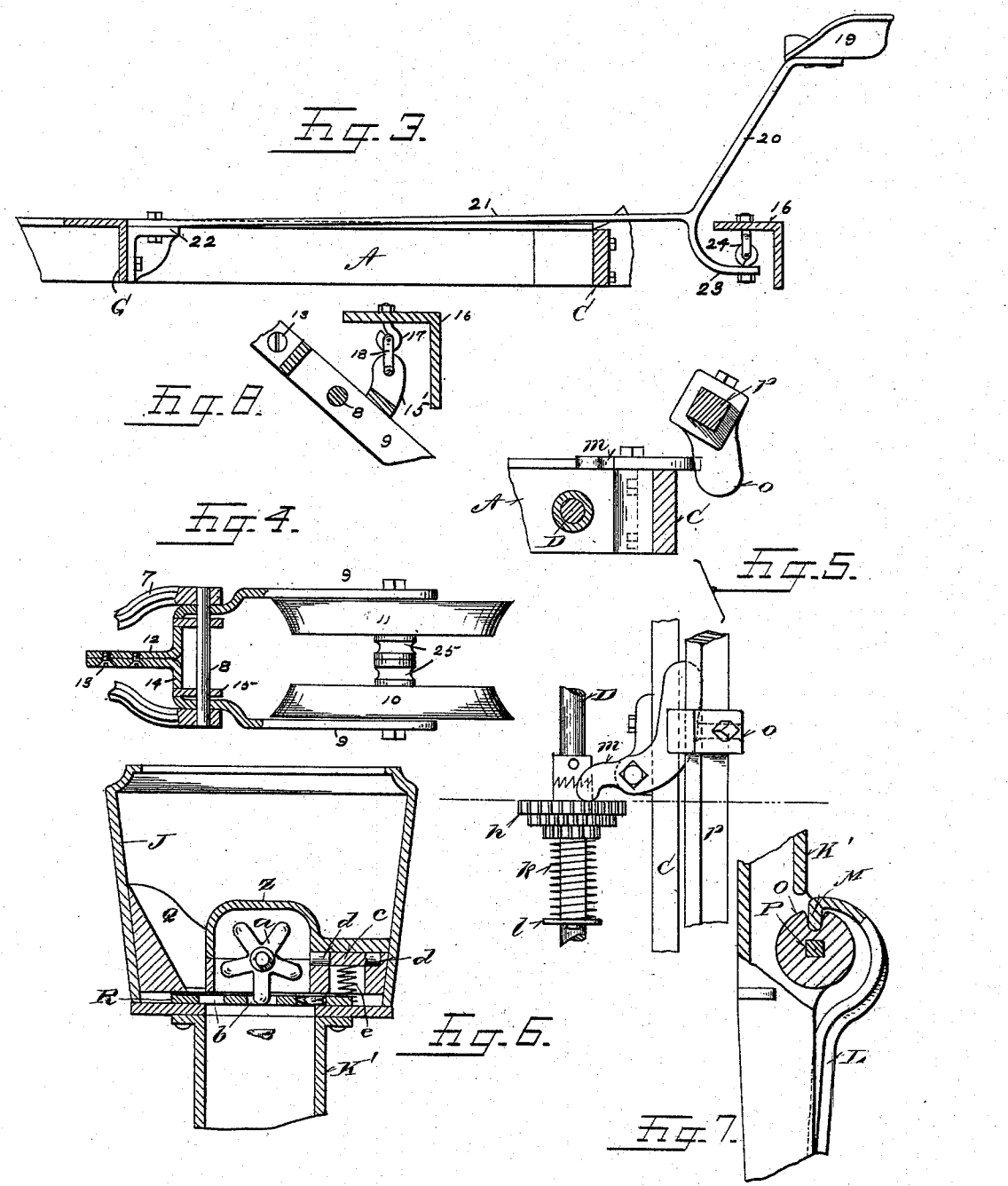
Witnesses
Inventor
George W. Campbell,
By his Attorney (No Model.) 4 Sheets—Sheet 4.

G. W. CAMPBELL.
CORN PLANTER.

No. 530,326. Patented Dec. 4, 1894.

Witnesses
Jas. C. Dawley
W. M. McMain.

Inventor
Geo. W. Campbell,
By H. A. Toulmin,
his Attorney.

UNITED STATES PATENT OFFICE.

GEORGE W. CAMPBELL, OF SPRINGFIELD, OHIO.

CORN-PLANTER.

SPECIFICATION forming part of Letters Patent No. 530,326, dated December 4, 1894.

Application filed February 27, 1894. Serial No. 501,675. (No model.)

*To all whom it may concern:*

Be it known that I, GEORGE W. CAMPBELL, a citizen of the United States, residing at Springfield, in the county of Clark and State of Ohio, have invented certain new and useful Improvements in Corn-Planters, of which the following is a specification, reference being had therein to the accompanying drawings.

This invention relates to certain new and useful improvements in corn planters.

The invention consists of the following particulars, which, generally stated, are, first, a rotating feeding disk perforated at uniform distances, combined with a feeding wheel or ejector whose spokes project down into the perforations of the disk, and positively force through such perforations the grains of corn or other seed, the wheel being rotated by the disk; second, combining covering wheels adapted to rise and fall with the unevenness of the ground, with a suitable cross-bar connected with the carrying arms of the wheels, and a seat attached to the main frame, but adapted to rise and fall, and also attached to the cross-bar, whereby the weight of the operator will be transferred to the wheels through this mechanism; third, a combination of the runner and the covering wheel, with devices for lifting both of them simultaneously by the action of a single lever; fourth, the grain spout and its pivoted valve, in combination with a rock-shaft, a disk fixed thereon and an engagement between the disk and the valve, so that by rotating the shaft the valve may be opened or closed, more or less; fifth, in combining with the feeding-plate, with perforations of equal distances apart, and the feeding-wheel which projects the grain through the perforations, of the main supporting wheels of the machine and intermediate speed-transmitting mechanism operating the said disk at different speeds, according to adjustment, so that notwithstanding that the holes in the disk are at equal distances apart and the grains consequently fed in the same length of time, one after the other, still they may be planted more or less close together, by varying the speed of the feeding disk; sixth, in constructing the feeding wheel so that its arms shall lie in substantially the same curve as that in which the perforations of the plate are located, so that the arms shall more readily enter such perforations without in anywise binding against the walls thereof.

Figure 2:
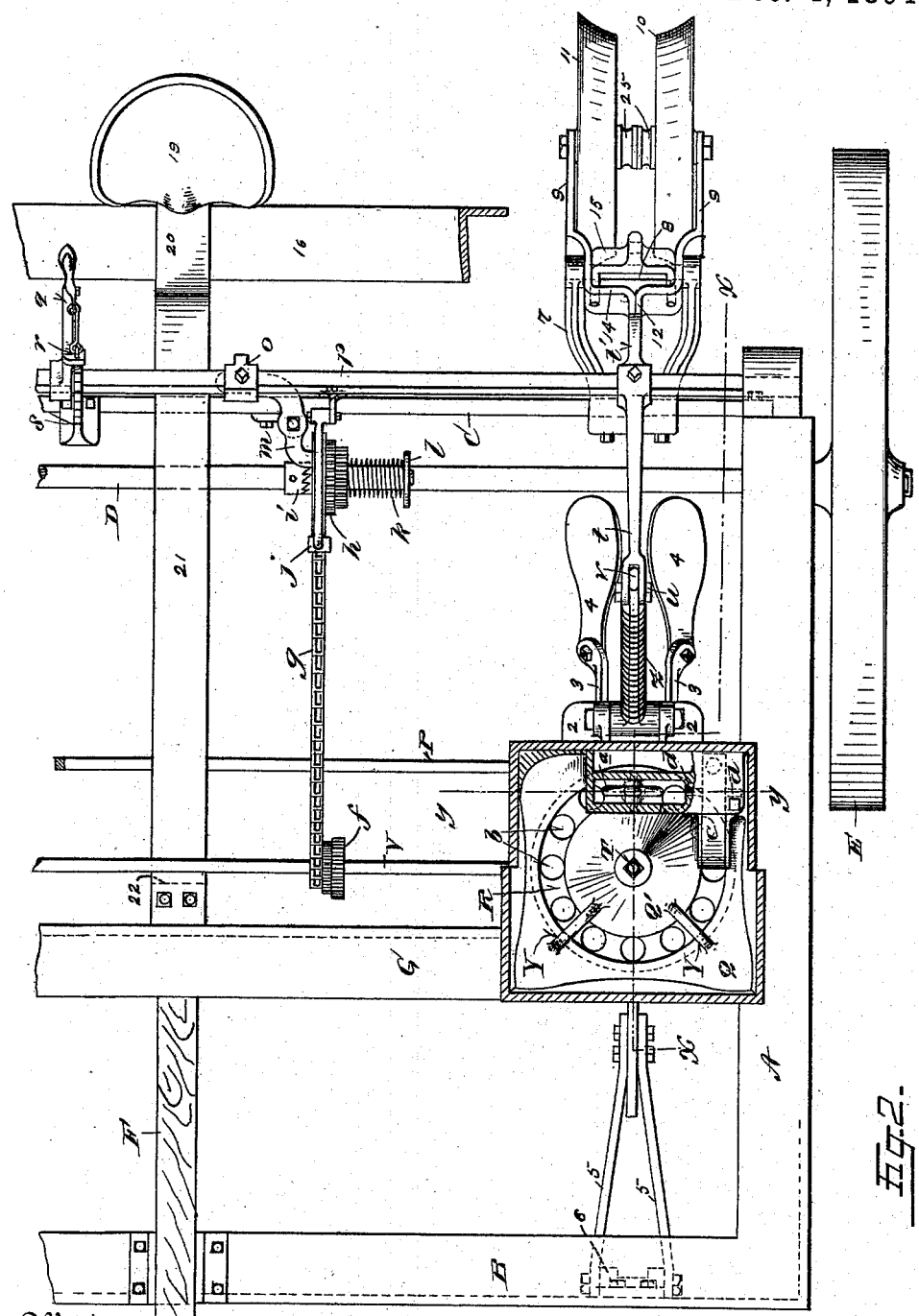
Figure 9:
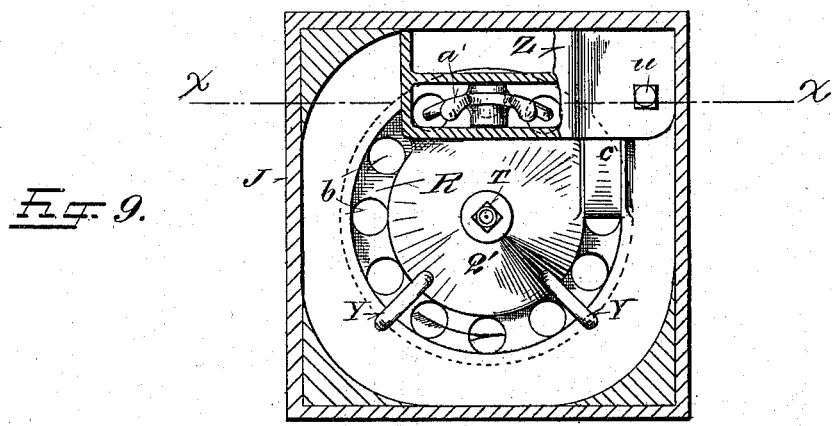
Figure 10:
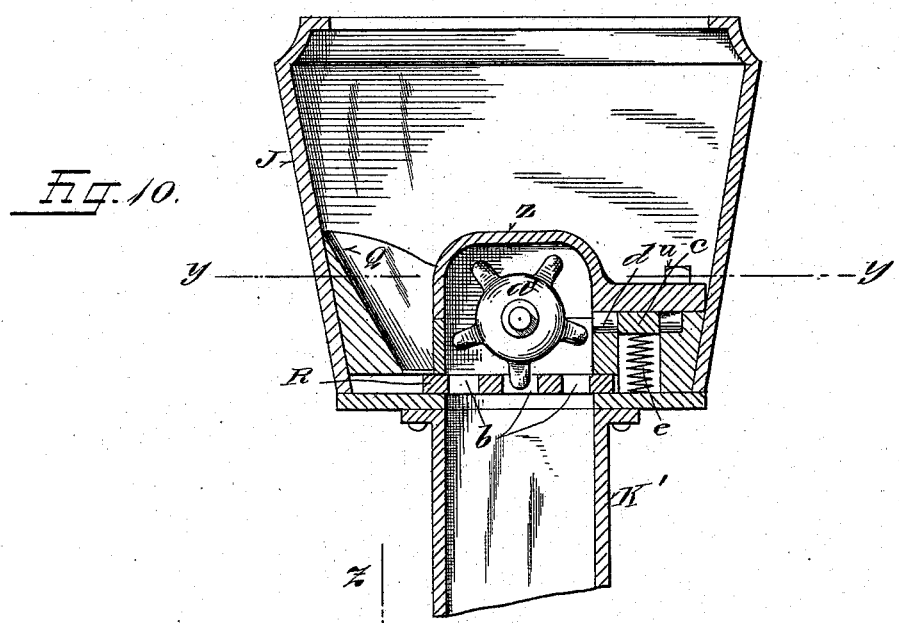
Figure 11:
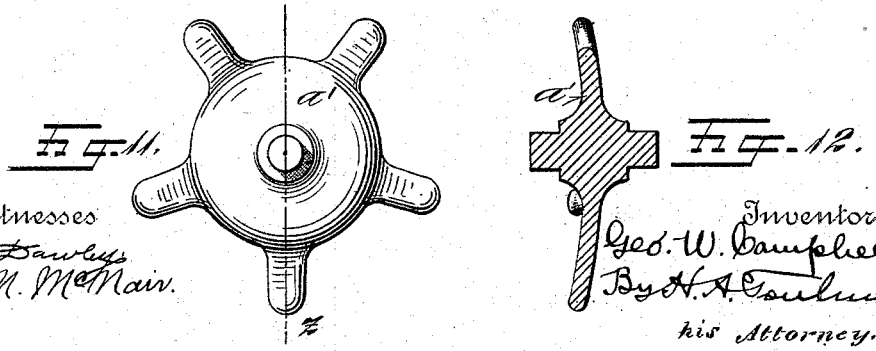
Figure 12:
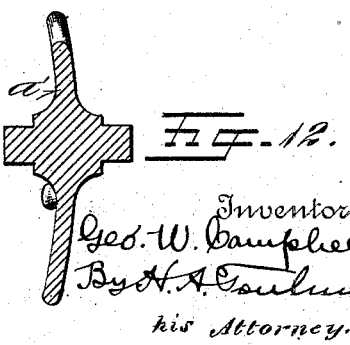

In the accompanying drawings on which like reference letters and figures indicate corresponding parts: Figure 1, represents a vertical sectional view taken on the line $x\ x$ of Fig. 2, showing some of the parts in side elevation; Fig. 2, a plan view of about one-half of the machine with some of the parts in horizontal section to facilitate illustration; Fig. 3, a detail sectional view of a part of the frame and the cross-bar with the seat in side elevation; Fig. 4, a partial plan and sectional view of the covering wheels and their connecting devices; Fig. 5, a detail sectional and plan view showing the mechanism for clutching and unclutching the cone-gears from the wheel axle; Fig. 6, an enlarged sectional view of the feeding hopper and its contained mechanism, on the line $y\ y$ of Fig. 2; Fig. 7, a detail view of the spout, its valve and operating disk; Fig. 8, a detail view of another form of connecting the cross-bar with the wheel arms; Fig. 9, a horizontal sectional view on the line $y\ y$ of Fig. 10 of one of the feeding boxes, showing the feeding plate and feeding wheel in plan; Fig. 10, a sectional view of the same on the line $x\ x$ of Fig. 9; Fig. 11, an enlarged view of one side of the feeding wheel; and Fig. 12, a sectional view on the line $z\ z$ of Fig. 11.

The frame is constructed of side pieces A and front and rear cross pieces B and C. The side pieces and front cross piece are preferably made of angle iron or steel. This frame is mounted in any approved manner upon the axle D, which is carried and rotated by ground wheels E. The usual pole F is also provided. A cross beam G is also provided, to which are connected brackets H and K, whereby the feeding box J is suitably supported; the feeding spout K' sustaining a part of the box and being itself connected to the bracket I.

Of course it will be understood that there are two feed boxes and that the mechanism in each is the same, and also that there are two runners and a corresponding number of covering wheels. In describing the invention I shall merely refer to one set of these devices, which are illustrated in Fig. 2.

The spout is composed of a cast tube K' extending from the bottom of the hopper down into the runner, preferably in the manner and for the purpose stated in Letters Patent granted to me February 20, 1894, and numbered 515,046. A valve L forms a part of one side of the spout, and has a lug M which fits a recess in a disk O secured to a rock-shaft P, which may be operated in any convenient manner, as by the means set forth in my patent above referred to. By rocking this shaft the valve may be opened or closed.

A confining frame Q, is placed in the feeding box J, to confine the feeding disk R in place, and to assist in supporting the bearing yoke S, by the bolt T, the yoke having a bearing U, which supports the shaft V carrying the beveled gear W as shown in dotted lines in Fig. 1, by which the feeding plate R is rotated, the latter having beveled teeth X. This confining frame fits down snugly in the feeding box and is cast with a circular space between its outer portion and its crown Q' the two parts being connected by bridge pieces Y. A cap plate Z fits upon this frame at one side and within it are placed the feeding wheels or ejector $a$, whose shaft is carried by the said frame and held down by the cap.

The feeding plate R is provided with a series of perforations $b$, at equal distances apart, so that the spokes of the wheel $a$ will step into them, one after the other, as the plate and wheel both rotate, the wheel receiving motion from the plate. In this manner the grain is forced through the perforations, one grain at a time, with perfect regularity and reliability. The plate rotates in the direction to cause the perforations in the plate to move toward and pass under the guard or cut-off $c$ which prevents more than one grain passing with the plate to the feeding wheel. This guard is preferably supported by trunnions $d$, which rest in bearings in the cap Z, and the frame Q, and is raised at its rear end by a spring $e$ which keeps the forward end down upon the feeding plate R. This plate is about as thick as the seed to be fed, so that they will settle down into the holes from which they are forced out by the wheel $a$, when the perforation is above the spout K'.

In order to vary the speed of the feeding plate, the shaft V has a series of sprocket wheels, commonly called cone-sprockets, $f$, either of which is operated by a sprocket chain $g$ traveling over another cone sprocket $h$, clutched to the axle D by a suitable clutch $i$. The pivoted arm $j$ drops down on the chain to keep it sufficiently tight. The cone-sprockets $h$, are held clutched by a spring $k$, bearing against the cone and against the shoulder plate $l$. To disengage the clutch a trip lever $m$ is supported upon the cross-bar C, and operated by a projection O, on the rock-shaft $p$, this shaft carrying a hand lever $q$, with the usual spring detent $r$, which locks into a notched segment $s$, carried by the cross-bar C. Thus when the projection O is moved forward it operates the trip lever $m$, which frees a part of the clutch and allows the axle to revolve without operating the cone sprockets. The speed of the shaft V is varied according to which of the cone sprockets the chain is on. This speed of the feeding disk R may be varied as compared to the speed with which the machine is traveling over the field, and hence the distance between the hills may be correspondingly varied so as to plant closer or farther apart.

On the rock-shaft $p$, is an arm whose forward end $t$, engages through a bolt $u$, with a link bar $v$, which latter is pivoted to the rear end of a runner $w$, and carries a small spring $z$, by which the arm $t$, presses down on the runner to hold it in the soil at the required depth. The runner carries guards 2, coverer arms 3, and coverers 4. The forward end of the runner is connected to two diverging drag bars 5, which themselves are pivoted to a bracket 6 carried by the forward cross bar B of the frame. The divergence of the drag-bars 5 assists in keeping the runner in the line of progression. They incidentally perform this function, but it may be formed in whole or in part by the spout K' in the manner set forth in my said Letters Patent hereinbefore referred to.

To the cross-bar C is attached a bracket 7, carrying a bolt 8, on which are pivoted the wheel arms 9, carrying the covering wheel composed of halves 10 and 11. The arms 9 unite forward of the bolt 8, and form a projection 12, the arms being connected together by screws 13. The cross piece 14 of the arms receives the forward ends of a bell-crank lever 15, mounted on the bolt 8 and connected to the cross-bar 16, by an eye-bolt 17 and a link 18.

The seat 19 is mounted on the standard 20, one portion of which runs forward and forms a flexible bar 21 and is connected by a bracket 22 to the cross-piece G of the frame, while its rear portion stands above the frame. The standard also branches back at 23, where it is connected by eye-bolts 24 to the cross-bar 16. Thus the weight of the operator and the seat and the cross-bar, &c., is brought upon the arms 9, the bell-crank lever 15 drawing upward and backward on the cross piece 14 of said arms.

The rear part $t'$ of the arm on the rock-shaft $p$ stands over the projection 12, so that when the runner is lifted the wheel is also lifted, and the locking of the said rock-shaft through the lever $q$, the detent $r$, and the segment $s$, holds both the runner and the wheel up. The convenience and the utility of this arrangement are a desideratum in the field and the practical use of this machine. The motions are quick and positive. They are quickly accomplished, and but one lever needs to be operated for the four purposes, namely, the holding down of the runner, the lifting of the runner, the lifting of the wheel, and a holding up of both of them.

Referring to the covering wheel itself, it will be seen that it is made in halves, with the peripheries beveled, and with removable spools 25, which can be placed between the halves, or on the outside of the halves when the latter are brought against each other. Thus the form of the covering wheel may be adjusted to suit the work of the coverers and the runner. No claim, however, is made in this application to this construction of covering wheel, as the same is embodied in my patent already several times referred to.

Referring to Fig. 8 it will be seen that the bell-crank lever 15 has been omitted and the wheel arms provided with a lug or projection 15' which is connected with the cross-bar 16. Either construction may be used, but the one illustrated in this figure is preferable.

The feeding box or hopper and the feeding plate, as also the manner of mounting the feeding wheel, are the same in Figs. 9 and 10 as in the other figures, hereinbefore described. In Figs. 9 to 12 inclusive I have illustrated, however, another, and indeed, the preferred form of feeding wheel or ejector. In these figures the wheel is designated $a'$ and the peculiarity consists in forming the wheel of a concaved, dished or deflected form so that the projecting spokes shall travel, when the wheel is rotated, in the arc of a circle. Looking at Fig. 9 it will be seen that as the perforations in the feeding plate R are in a circle, so the feeding wheel is in a similar curve. Where the center of the feeding plate R intersects the axial line of the feeding wheel is formed a convenient center from which to strike the curve in which shall stand or lie the spokes of the wheel, and in consequence the spokes enter the perforations without binding upon their walls.

Another reason for so forming the wheel is that when the holes in the plate are the smallest size used the spokes of a wheel that is straight across the face, will not enter such holes if the spokes are large enough to work effectively with plates whose holes are of the largest size used. Thus to render the wheel capable of use with the various sized holes of the various plates and to have the spokes of a certain mean size in diameter so as to work well with all of such sizes of holes, it is necessary to give the wheel the peculiar form described.

In manufacturing this machine I make various sized holes in different plates to suit the size of kernels found in different parts of the country. By thus forming the wheel I am enabled to make one wheel answer for all, no matter what are the sizes of the holes. The holes are always in a circle of the same radius, whether they be large or small holes. I fashion the curvature or dish of the feeding wheel for the smallest holes required, and then it answers for all the other sizes of holes.

Having thus fully described my invention, what I claim as new, and desire to secure by Letters Patent, is—

1. In a corn planter, the combination with the main frame, a pivoted runner, and a pivoted covering wheel carried by arms, of devices to hold down on the runner and lift up and hold up the runner and the wheel, consisting essentially of a lever, an arm operated thereby, a connection between one end of the arm and the runner, said connection being yielding in one direction, and an engagement between the other end of said arm and the wheel arms.

2. In a corn planter, the combination with the main frame, a pivoted runner, and a pivoted covering wheel carried by arms, of mechanism to lift both the runner and the wheel from the ground at about the same time, consisting essentially of a lever, an arm operated thereby, a connection between one end of the arm and the runner, and an engagement between the other end of the arm and the wheel arms.

3. In a corn planter, the combination with the main frame and pivoted runner, a covering wheel carried by pivoted arms, a lever, a rock-shaft operated thereby, an arm on the rock-shaft, a link connecting one end of the arm with the runner, a spring between said end of the arm and the runner to press down on the latter, and an engagement between the other end of the arm and the wheel arms when the lever is operated to lift the runner and wheel.

4. In a corn planter, the combination with the main frame, a pivoted runner, a covering wheel carried by pivoted arms, mechanism to hold down on the runner and wheel and to lift the same at or about the same time, said mechanism consisting of a lever, an arm operated thereby, one end of which is connected to the runner, an engagement between the other end of the arm and the wheel arms when the latter are being raised, the seat, a cross-bar connected thereto and a connection between said bar and the wheel arms acting back of the pivot of the latter.

5. In a corn planter, the combination with the main frame, and a covering wheel carried by pivoted arms connected with said frame, a bell-crank lever engaging with wheel arms, and cross-bar connected, substantially as described, with the said lever, and a seat connected with the cross-bar.

6. In a corn planter, the combination with a seat connected to the main frame, a cross-bar connected with the seat, and a covering wheel connected to the frame by pivoted arms, and a connection between the cross bar and the said wheel arms operating in the rear of the pivot thereof.

7. In a corn planter, the combination with a feeding plate having perforations, of a feeding wheel or ejector curved or dished so that its spokes or projections shall occupy a curve of substantially the same radius as the curve in which the perforations lie, whereby the same feeding wheel is adapted to work with plates of various sizes of perforations so that a change of wheel is not required for every change of plate for different sizes of grain.

8. In a corn planter, the combination with the main axle, driving mechanism clutched thereto, a spring engaging said mechanism to keep it clutched, a rock-shaft, a lever therefor and a projection on the rock-shaft, and a horizontal trip lever pivotally supported by the main frame and having one end engaged by the said projection, and its other end engaging the side of the driving mechanism.

In testimony whereof I affix my signature in presence of two witnesses.

GEORGE W. CAMPBELL.

Witnesses:
   OLIVER H. MILLER,
   W. M. MCNAIR.